Jan. 1, 1924
G. L. CABOT
SUPPLY MEANS FOR AIRCRAFT
Filed Nov. 25, 1918
1,479,222
2 Sheets-Sheet 2
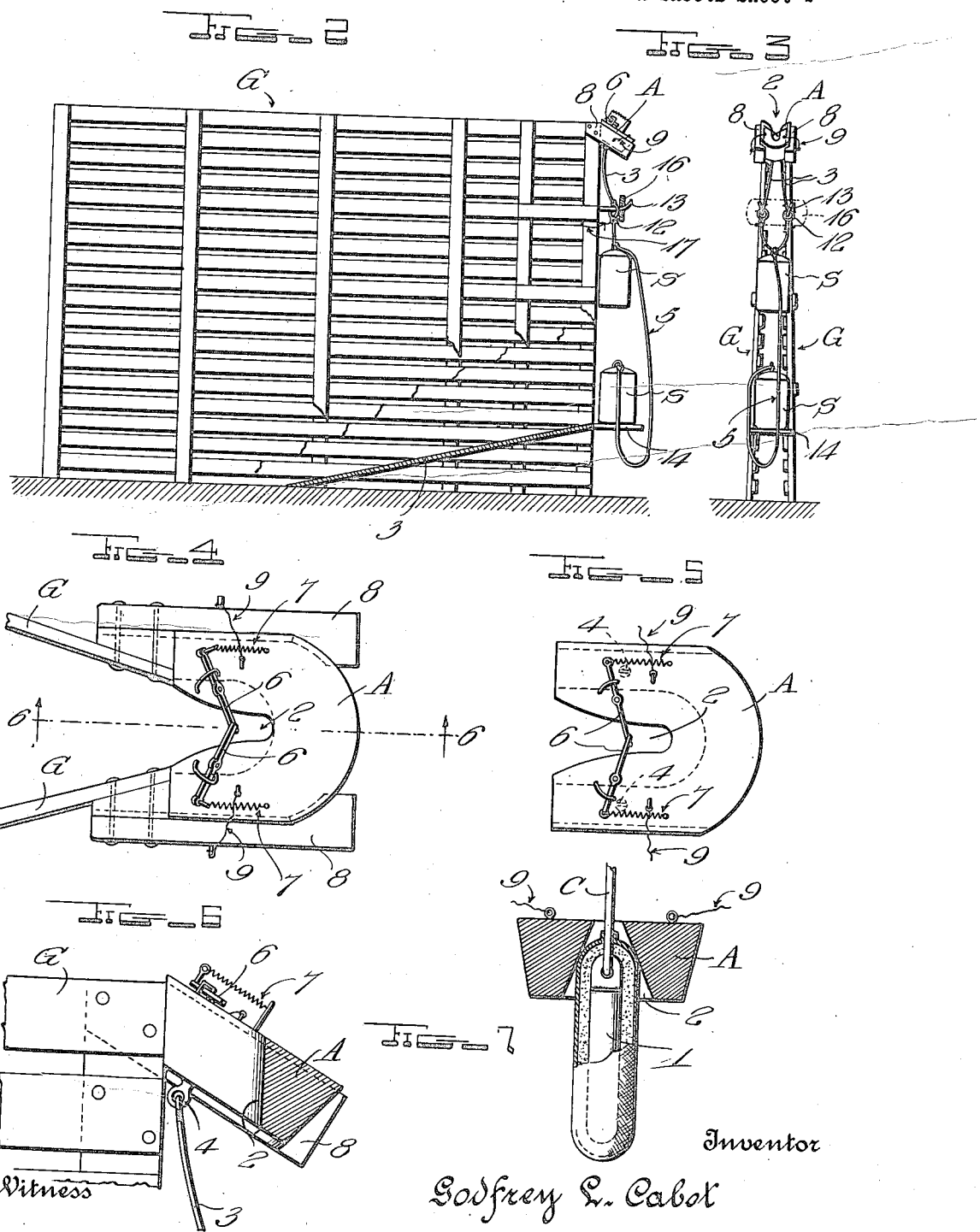

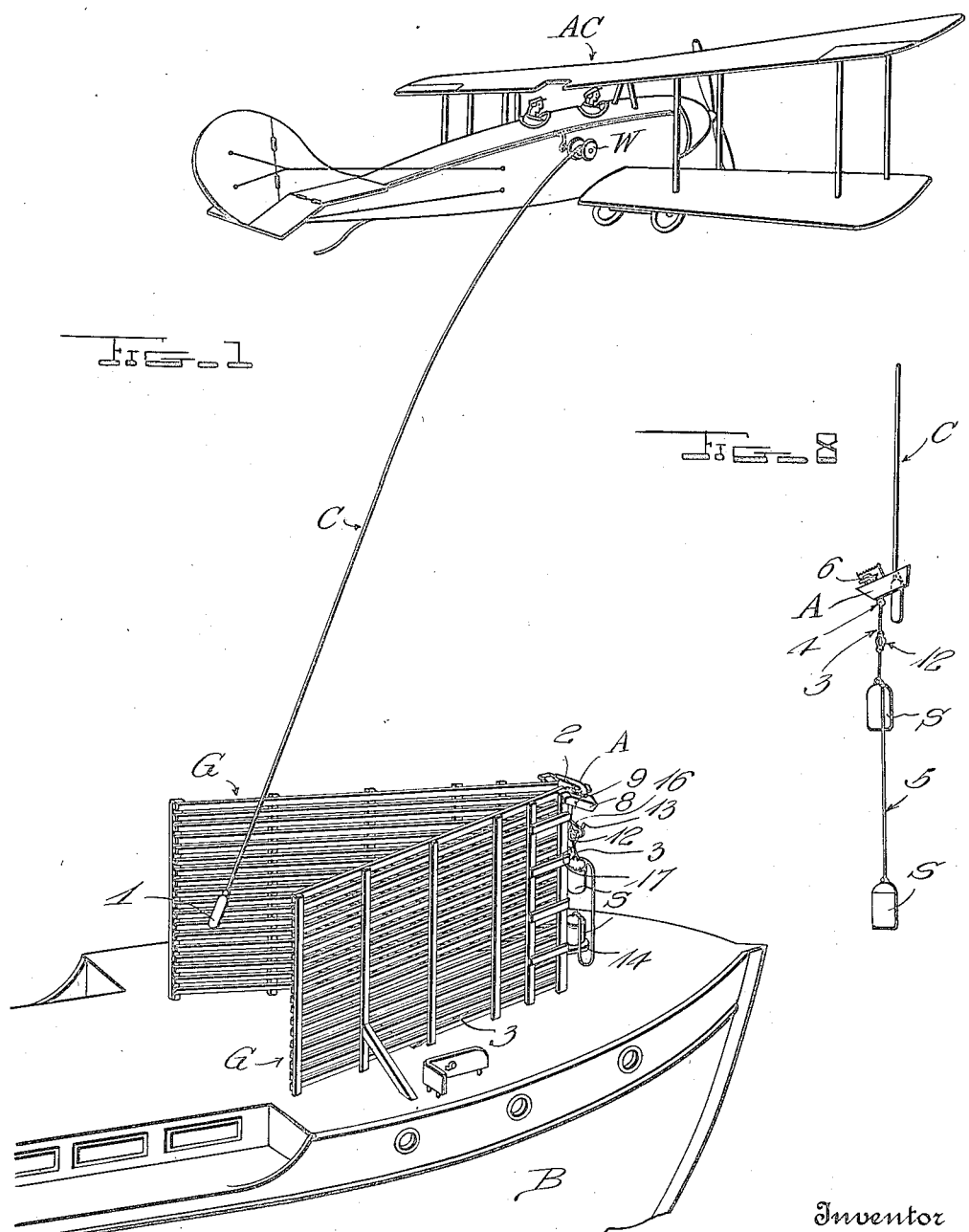

Patented Jan. 1, 1924.

1,479,222

UNITED STATES PATENT OFFICE.

GODFREY L. CABOT, OF BOSTON, MASSACHUSETTS.

SUPPLY MEANS FOR AIRCRAFT.

Application filed November 25, 1918. Serial No. 264,083.

*To all whom it may concern:*

Be it known that I, GODFREY L. CABOT, a citizen of the United States, residing at Boston, in the county of Suffolk and State of Massachusetts, have invented certain new and useful Improvements in Supply Means for Aircraft; and I do declare the following to be a full, clear, and exact description of the invention, such as will enable others skilled in the art to which it appertains to make and use the same.

My invention aims to provide improved means for furnishing fuel and other supplies to air-planes, seaplanes, and other types of aircraft while in flight, the present application being an improvement on my U. S. application filed on or about May 9th, 1918, under Serial No. 233,520.

The principal object of the invention is to overcome certain difficulties encountered when using the structure shown by the original application, these improved results being obtained by the provision of several novel features of construction and unique arrangements of parts hereinafter fully described and claimed, reference being made to the accompanying drawings.

Figure 1 is a perspective view showing the manner in which the pick-up cable which depends from the aircraft is guided to the anchor member to which the supplies are attached.

Fig. 2 is a side elevation partly in section showing the holding means for the anchor member and the supplies attached thereto, and the means for guiding the pick-up cable to said anchor member.

Fig. 3 is an end elevation of the right-hand end of Fig. 2.

Fig. 4 is a top plan view of the right-hand end of Fig. 2.

Fig. 5 is a true top plan of the anchor member.

Fig. 6 is a detail section on the plane of the line 6—6 of Fig. 4.

Fig. 7 is a detail transverse section of the anchor member showing the manner in which the padded weight on the pick-up cable lodges in the throat thereof.

Fig. 8 is a detail side elevation illustrating the manner in which the weight of the supplies cants the anchor member to prevent slippage of the pick-up cable from the throat of said anchor member.

Briefly speaking, the invention consists of an anchor member A to which the supplies S are attached, an elastic cable C depending from the aircraft A C, guides G for directing the cable to the anchor member A, means for holding said anchor member in proper position to receive the cable, means whereby a reliable connection between the cable and anchor member is established, and means for holding the supplies in such a manner as to permit them to readily leave such holding means when the anchor member is picked up by the cable.

The guides G may be mounted on land or upon a suitable boat, pontoon or the like B, and said guides preferably consist of slatted vertical walls converging in horizontal directions, with their closely spaced ends arranged in such relation as to permit a padded weight 1 on the cable C to pass between them into the throat 2 of the anchor member A. An inclined bottom 3 will preferably be provided in the space between the two walls G, in order to assist in guiding the weight 1 to the proper elevation, in case too much of the cable C should be depending from the aircraft. It is intended that the cable shall enter the throat 2 and draw upwardly through the latter until the padded weight 1 is snugly seated in said throat, as seen in Fig. 7, the throat in question being upwardly tapered for this purpose. When the weight is seated in the throat, the cable C begins to stretch and such stretching continues until the tension is enough to break the anchor member A loose from its holding means. When this takes place, the anchor member is quickly raised by the elasticity of the cable and carries with it the supplies S. It will be observed that the throat 2 opens through one end of the anchor member A and through the top and bottom thereof and in order to prevent the slippage of the cable from the throat, it is highly desirable to so attach the supplies S to said member, as to cause canting of the latter as seen in Fig. 8. In obtaining this result, the cables 3 by which one of the burdens is attached to the anchor member, are connected to eyes 4 which are located adjacent the open end of the throat 2 and on opposite sides of such throat. By this arrangement, the weight of the supplies will cant the anchor member in a direction to prevent any possibility of the cable and weight slipping laterally from the throat. When more than one burden is to be picked up simultaneously, the several burdens may be connected by cables such as 5, which cables may or may not be elastic as occasion may dictate.

In some instances, in addition to canting the anchor member A as above set forth, it is advisable to provide positive means to prevent possible lateral slippage of the cable C from the throat 2. This may of course be accomplished in numerous ways but for illustrative purposes I have shown a pair of levers 6 fulcrumed upon the upper side of the anchor member and normally moved by springs 7 so that they project across the throat 2. When the cable C enters the throat, the levers 6 yield to an inoperative position and permit said cable to fully enter the throat. Upon such complete entrance, the springs 7 restore the levers to their normal positions, so that they serve as retainers to confine the cable in the throat.

The holding means for the anchor member A might well assume different forms, but I prefer to construct such holding means as illustrated most clearly in Figs. 4 and 6. A pair of arms 8 are secured to the closely spaced ends of the guides G, at the upper corners thereof, and incline downwardly from their anchored ends. The anchor member A is snugly received between the arms 8 and is lashed thereto by suitable cords or thongs 9, so as to retain the open throat 2 in proper communication with the space between the guides G. The lashings or thongs retain the anchor member A rigidly in position but are sufficiently weak to break under the lifting power exerted by the cable C. It is thus insured that the anchor member shall not be accidentally displaced, yet that it shall readily ascend when required.

I have stated that the arms 8 incline downwardly from their anchored ends and by reference more particularly to Figs. 1, 2 and 6, it will be seen that such inclination will cause the anchor member to be held in an inclined position. The inclination of the anchor member is substantially that of the direction in which it must travel when it is picked up by the cable C, and thus no binding action whatever will take place. Furthermore, the inner faces 10 of the arms 8 diverge upwardly for contact with the downwardly tapered sides 11 of the anchor member A, thus insuring easy disengagement of the latter from the former.

The sacks or other containers for the supplies may well be supported in any suitable manner and I have illustrated but one method of support for illustrative purposes. The cables 3 are provided with eyes 12 and by means of these eyes and cables, the first burden is suspended by pins 13 which project from the guides G. The other burden may rest upon a shelf or the like 14 with sufficient slack in the cable 5 to permit the first burden to start well on its way before the other is picked up. By this means, the strain upon the aircraft is not as great as would occur if the entire load were picked up at once. Also, the elasticity of the cable C positively prevents any sudden jerk upon the machine.

Any adequate means may be employed for winding the cable to raise the supplies and for illustrative purposes, I have shown a windlass W mounted upon the aircraft, and it will be obvious that any operating means may be used for such windlass.

In operation, the supplies S are placed in suitable containers such as sacks, and connected to the cables 3 and 5, the former being attached to the anchor member A by means of the eyes 4. The eyes 12 are hooked over the pins 13 and a retaining bar 16 may be loosely tied at 17 upon said pins to prevent accidental removal of said eyes 12. The anchor member A is positioned between the arms 8 and lashed thereto at 9, and the device is then in condition for operation. The cable C is paid out from the aircraft to the proper extent and by now flying directly over the guides G, the weight 1 will be received between said guides as indicated in Fig. 1. This weight serves to prevent horizontal trailing of the cable C and also, when the cable is received in the throat 2, the weight in question serves to prevent longitudinal slippage of said cable from the throat. After the weight has seated in the throat 2 and considerable stretching of the cable C has taken place, the lashings 9 are broken by the pull of said cable, with the result that the anchor member A quickly leaves its holding means and pulls loose from the pins 13, the lashings 17 breaking in the meantime and permitting the retainer 16 to drop entirely out of the way. Ascent of the first burden removes the slack in the cable 5 and thus the second burden is picked up. It will be obvious that only one sack or the like could be picked up by the cable or that any number could be raised. The invention is intended principally for supplying fuel to aircraft while in flight, but may obviously be used also for handling numerous other supplies such as ammunition, bombs, repair parts, etc.

The device has been successfully operated in connection with a full sized machine and such operation has proven that the device is practical in all respects when constructed as, or substantially as, shown and described. On account of these known merits, the arrangement disclosed is preferably followed, but it is to be understood that such disclosure is merely typical of one of the many forms in which the apparatus might be embodied, and that I do not therefore wish to be restricted to the exact arrangement shown.

I claim:

1. In a supply means for aircraft, a pair of converging vertical walls, an anchor member to which the supplies are attached, means for holding said anchor member at the closely spaced ends of said walls, a cable depending from the aircraft to be guided to said anchor member by said walls, a weight on the end of said cable, and an inclined bottom between said walls to guide the weight upwardly, provision being made for connecting said cable and anchor member upon engagement of the former with the latter.

2. Aircraft supply means having an anchor member to which the supplies are attached and a cable on the aircraft for picking up said anchor member and supplies, and means for holding said anchor member in a position inclined in approximately the direction in which it must travel when picked up by said cable.

3. A structure as specified in claim 2, said anchor member and holding means being downwardly tapered to insure easy removal of the former from the latter.

4. Aircraft supply means having an anchor member to which the supplies are attached and a cable on the aircraft for picking up said anchor member and supplies, means for guiding the cable into engagement with said anchor member, and a pair of fixedly supported arms disconnected throughout their lengths and removably holding said anchor member therebetween.

5. A structure as specified in claim 4, said anchor member being downwardly tapered and the inner faces of said arm diverging upwardly for contact therewith, whereby to insure easy removal of said anchor member when engaged by the cable.

6. A structure as specified in claim 4, said arms being inclined to position said anchor member at an incline similar to the direction in which it must travel when picked up by said cable.

7. A structure as specified in claim 4, said arms being inclined to position said anchor member at an incline similar to the direction in which it must travel when picked up by said cable, said anchor member being downwardly tapered, and the inner faces of said arms diverging upwardly for contact therewith, whereby to insure easy removal of said anchor member when engaged by said cable.

8. A supply means for aircraft consisting of an anchor member to which the supplies are attached, means for removably holding said anchor member, said member having an open throat, a cable depending from the aircraft for reception in said throat to raise said anchor member, and means for positively retaining said cable in said throat.

9. A supply means for aircraft consisting of an anchor member to which the supplies are attached, means for removably holding said anchor member, said member having an open throat, a cable depending from the aircraft for reception in said throat to raise said anchor member, and spring-actuated means to close said throat and retain said cable therein.

10. A supply means for aircraft consisting of an anchor member to which the supplies are attached, means for removably holding said anchor member, said member having an open throat, a cable depending from the aircraft for reception in said throat to raise said anchor member, a pivoted retainer mounted on said anchor member, and a spring yieldably positioning said retainer across said throat to prevent lateral slippage of said cable from said throat, said retainer being yieldable to an inoperative position to permit the cable to fully enter the throat.

11. In an aircraft supply means, an anchor member to which the supplies are attached, a cable depending from the aircraft and adapted to pick up said anchor member, a support and frangible thong means for lashing said anchor member to said support.

12. In an aircraft supply means, an anchor member to which the supplies are attached, a cable depending from the aircraft for engagement with said anchor member and means for connecting said anchor member and cable upon such engagement, the point of connection between said supplies and anchor member being located to cant the latter and prevent disengagement of said connecting means.

13. A supply means for aircraft consisting of an anchor member to which the supplies are attached, means for removably holding said anchor member, said member having an open throat, and a cable depending from the aircraft for the reception in said throat to raise said anchor member, the point at which the supplies are attached to said anchor member being located to cant the latter in a manner to prevent lateral slippage of said cable from said throat.

14. Aircraft supply means having an anchor member to which the supplies are attached and a cable on the aircraft for picking up said anchor member and supplies, a pin upon which the supplies are hung, a retainer for normally holding the supplies against slippage from the pin, and frangible means for holding said retainer in place until said anchor member is picked up by the cable.

In testimony whereof I have hereunto set my hand.

GODFREY L. CABOT.